United States Patent [19]

Goldmann et al.

[11] 4,300,879
[45] Nov. 17, 1981

[54] PROCESS FOR THE HEAT-TREATMENT OF FINE-GRAINED MATERIAL

[75] Inventors: Wolf Goldmann; Dieter Michaelsen, both of Beckum; Dieter Dreyer; Dietmar Holsiepe, both of Ennigerloh; Peter Tiggesbaumker, Oelde; Klaus Bauer, Oelde; Manfred Durr, Oelde; Heinz G. Mersmann, Beckum, all of Fed. Rep. of Germany

[73] Assignee: Krupp Polysius AG, Beckum, Fed. Rep. of Germany

[21] Appl. No.: 90,876

[22] Filed: Nov. 2, 1979

[30] Foreign Application Priority Data

Nov. 30, 1978 [DE] Fed. Rep. of Germany ....... 2851887

[51] Int. Cl.³ .......................... F27B 15/00; F27D 7/00
[52] U.S. Cl. ...................................... 432/14; 106/100; 432/19; 432/58
[58] Field of Search ...................... 432/14, 37, 58, 106, 432/19; 106/100

[56] References Cited

U.S. PATENT DOCUMENTS 3,884,621 5/1975 Summer .............................. 432/37
4,077,763 3/1978 Jager et al. ........................... 432/14

FOREIGN PATENT DOCUMENTS 2149149 4/1973 Fed. Rep. of Germany ........ 432/37

Primary Examiner—John J. Camby
Attorney, Agent, or Firm—Learman & McCulloch

[57] ABSTRACT

A process for the heat-treatment of fine-grained material which is preheated in a cyclone preheater, deacidified by additional fuel in a precalcination zone, and subsequently calcined to completion in a revolving tubular kiln. The gas temperature in the cyclone preheater and the material temperature after passage through the precalcination zone are measured, the difference between these temperatures is determined and, when the temperature difference reaches a maximum or minimum value, regulation of the fuel supply to the precalcination zone is switched to manual operation. In this way, the amount of fuel is rapidly adapted to the particular circumstances prevailing in the event of disturbances.

8 Claims, 2 Drawing Figures

PROCESS FOR THE HEAT-TREATMENT OF FINE-GRAINED MATERIAL

BACKGROUND OF THE INVENTION

This invention relates to a process for the heat-treatment of fine-grained material, particularly cement raw material, which is preheated by hot gases in a multistage cyclone preheater, subsequently deacidified to a large extent by additional fuel in a precalcination zone and, finally, calcined to completion in a revolving tubular kiln, the supply of fuel to the precalcination zone being automatically regulated in normal operation in dependence upon a gas temperature of the cyclone preheater in such a way that, in the event of a reduction in this gas temperature, the supply of fuel is increased and vice versa.

In the heat-treatment of fined-grained material, particularly cement raw material, it has proved to be favorable for reasons associated with the plant used to carry out a large part of the calcination of the material outside the revolving tubular kiln in a precalcination zone which forms the lowermost part of the preheater or the transition between the cyclone preheater and the revolving tubular kiln. See, for example, German Auslegeschrifts Nos. 2,324,265 and 2,611,239. Since this calcination (removal of the $CO_2$ from the raw material) is a highly endothermic process, fuel has to be additionally supplied to the precalcination zone through which the exhaust gases of the revolving tubular kiln and/or cooler air flow(s).

Hitherto, this supply of fuel to the precalcination zone has normally been regulated in dependence upon the exhaust gas temperature of the precalcination zone in such a way that, in the event of a reduction in this gas temperature, the fuel supply is increased and vice versa. In this way, it is possible in normal operation to obtain optimal fuel conditions in the precalcination zone, even in the event of fluctuations in the input of material.

However, closer investigations have shown that this known method of regulation fails when certain types of irregularities or disturbances arise. If, for example, the fuel supplied is not completely burnt in the precalcination zone (for example through disturbances in the air supply), there is a reduction in the exhaust gas temperature of the precalcination zone which initiates the adjustment whereby the supply of fuel is increased. The disturbance in question is further increased in this way.

Accordingly, an object of the present invention is to provide a process of the kind referred to such that, not only in normal operation, but also in the event of the most important types of disturbances in practice, the amount of fuel supplied is rapidly adapted to the particular circumstances prevailing.

SUMMARY OF THE INVENTION

According to the invention, this object is achieved in that the gas temperature in the precalcination zone and the temperature of the material after passage through the precalcination zone are measured at the same time, the difference between this material temperature and the abovementioned gas temperature is determined, and, when this temperature difference reaches a maximum or minimum value, regulation of the fuel supply to the precalcination zone is switched to manual operation.

If, for example, the fuel supplied is incompletely burnt in the precalcination zone, there is a reduction in the gas temperature (which in normal operation is used for regulating the fuel supply). As a result, the difference between this gas temperature and the material temperature becomes smaller. When this temperature difference reaches a predetermined minimum value, regulation of the fuel supply to the precalcination zone is switched to manual operation.

If, in addition, a disturbance is caused in operation by blockage of material in the cyclone following the precalcination zone, the measuring device which measures the temperature of the material deposited in that cyclone determines a lower material temperature (because where the temperature is measured by thermocouples in the material feed line, as is normally the case, no satisfactory contact is present between a thermocouple and material). Accordingly, the difference between the gas temperature and the material temperature increases and, on reaching a predetermined maximum value, likewise initiates switching of the fuel supply to manual control.

Similar circumstances characterise another disturbance occasionally arising in practice through crust and agglomerate formation when the critical material temperature is exceeded. In this case, too, an excessively low material temperature is wrongly measured, causing regulation of the fuel supply to be switched to manual operation when the temperature difference between gas and material reaches the predetermined maximum value. It is clear that, in this precise case, retention of or even an increase in the supply of fuel through automatic regulation initiated by the heavy crust and agglomerate formation can give rise to serious disturbances whereas, if the fuel supply is switched to manual control, the conditions may rapidly be normalized.

Where the process according to the invention is carried out using an installation in which the precalcination zone is formed by the gas line connecting the revolving tubular kiln to the lowermost cyclone stage of the cyclone preheater, the supply of fuel to the precalcination zone in normal operation is best regulated in dependence upon the exhaust gas temperature of the lowermost cyclone stage and the difference between this exhaust gas temperature and the temperature of the material deposited in the lowermost cyclone stage is monitored.

Where the process according to the invention is carried out using an installation in which the lowermost cyclone stage is formed by at least two cyclones connected in parallel, it is favorable in accordance with the invention to regulate the fuel supply to the precalcination zone in normal operation in dependence upon the mean value of the exhaust gas temperatures of the two cyclones of the lowermost cyclone stage, to monitor the difference between each of the two exhaust gas temperatures and the temperature of the material deposited from the associated cyclone of the lowermost cyclone stage, and to switch regulation of the fuel supply to the precalcination zone to manual operation when one of the two temperature differences reaches a maximum or minimum value.

The required value of the difference between the gas and material temperatures may be of the order of 20° C. In this case, regulation of the fuel supply is switched to manual operation when the temperature difference reaches a minimum value of around 0° C. and a maximum value of around 40° C.

It has also been found to be of advantage in the process according to the invention to switch regulation of the fuel supply to the precalcination zone to manual operation not only on reaching a maximum or minimum value of the difference between the gas and material temperatures, but also on reaching a maximum exhaust gas temperature of the lowermost cyclone stage, preferably of around 900° C., or a minimum exhaust gas temperature of preferably around 800° C. In this way, it is possible to cover possible disturbances where, although the abovementioned temperature difference between gas and material remains within the range between the minimum and maximum values, the exhaust gas temperature exceeds or falls below a predetermined maximum or minimum value.

In addition, the gas stream flowing through the cyclone preheater is best monitored for its CO and $O_2$ content. When a maximum CO content is reached, the fuel supply to the precalcination zone is best immediately switched off whereas, when a minimum $O_2$ content is reached, it is generally sufficient for an alarm to be set off in the first instance. This alarm draws the attention of the operator to the fact that the need for switching of regulation of the fuel supply to manual operation is imminent.

DESCRIPTION OF THE DRAWINGS

Two embodiments of installations for carrying out the process according to the invention are illustrated in the accompanying drawings, wherein.

DETAILED DESCRIPTION OF THE INVENTION

Figure 1:
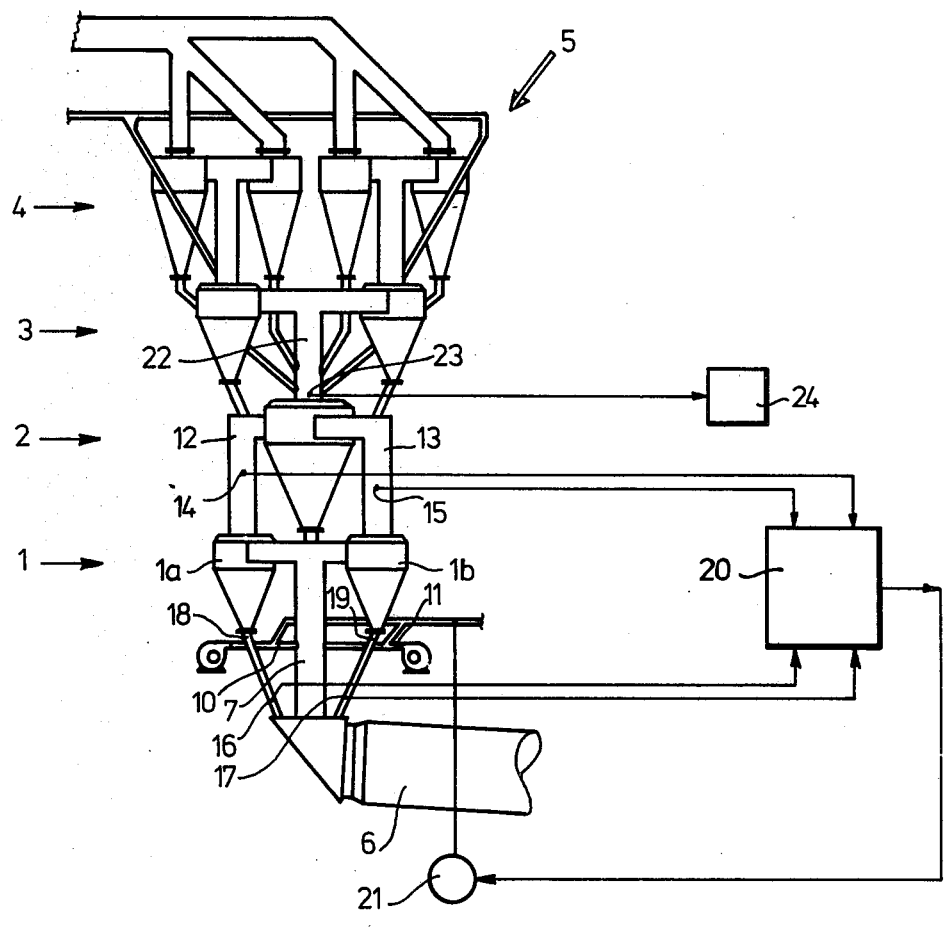
FIG. 1 is a diagrammatic view of one embodiment.

The installation shown in FIG. 1 comprises a cyclone preheater 5 consisting of four cyclone stages 1, 2, 3, 4 and a revolving tubular kiln 6. The precalcination zone is formed by the gas line 7 which connects the revolving tubular kiln 6 to the two cyclones 1a, 1b of the lowermost cyclone stage 1. Fuel is introduced into this gas line 7 through pipes 10, 11.

In other respects, the cyclone preheater 5 is of standard construction. The cyclone stage 2 consists of a single cyclone, the cyclone stage 3 of two cyclones connected in parallel, and the uppermost cyclone stage 4 of four cyclones connected in parallel. The connection of the cyclones by the gas and material lines is clear from the drawing and does not require further explanation.

Temperature sensors 14, 15 of known kind are provided in the two gas lines 12, 13 leading from the cyclones 1a, 1b of the lowermost cyclone stage 1 to the cyclone stage 2. Further temperature sensors 16, 17 of known kind are provided in the material lines 18, 19 which lead from the cyclones 1a, 1b of the lowermost cyclone stage 1 to the revolving tubular kiln 6.

The temperature sensors 14 to 17 are connected to a measuring, indicating and regulating system 20 of known construction which acts on the fuel supply to the precalcination zone through a regulating unit 21, also of known construction.

Finally, the installation comprises another known sensor 23 which is arranged in the exhaust gas pipe 22 of the cyclone stage 2 and connected to a known measuring device 24 which determines the $O_2$ and CO content of the exhaust gases.

The mode of operation of the installation shown in FIG. 1 is as follows:

In normal operation, the amount of fuel delivered to the precalcination zone (gas line 7) through the pipes 10, 11 is regulated by the system 20 solely in dependence upon the mean value of the exhaust gas temperature measured by the temperature sensors 14, 15. In the event of a reduction in this exhaust gas temperature (for example, through an increase in the output of material), the supply of fuel is increased and vice versa. In normal operation, the exhaust gas temperature remains within a temperature range between 800° C. and 900° C. If the temperature of the exhaust gas exceeds 900° C. or falls below 800° C., regulation of the fuel supply is switched over to manual operation to increase or decrease the supply of fuel as desired.

In addition, the measuring, indicating, and regulating system 20 monitors the temperature difference between the exhaust gas temperatures measured by the temperature sensors 14, 15 and the material temperature as determined by the sensors 16, 17 in the material lines 18, 19. In normal operation of the installation, this temperature difference is of the order of 20° C. for each of the two cyclones 1a, 1b. However, if this temperature difference reaches the maximum value of 40° C. or the minimum value of 0° C. (which is possible in the event of any post-combustion of fuel in the cyclone) for one of the two cyclones, the system 20 switches the installation from automatic to manual regulation.

Figure 2:
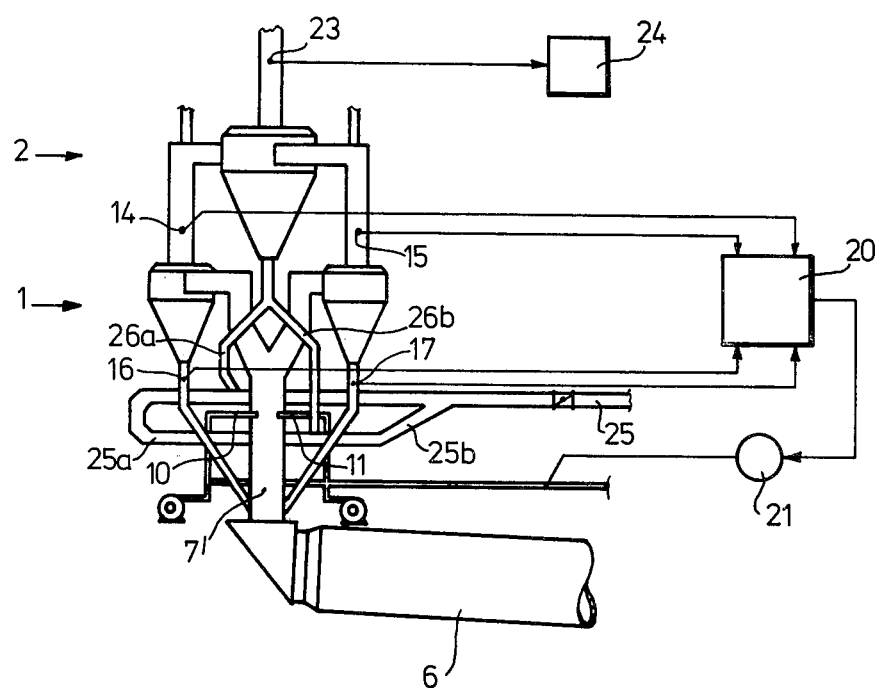
FIG. 2 is a diagrammatic view of the second embodiment.

In the embodiment illustrated in FIG. 1, the exhaust gases of the revolving tubular kiln 6 are exclusively delivered to the precalcination zone (gas line 7) as oxygen-containing combustion medium. By contrast, FIG. 2 illustrates the application of the process according to the invention in an installation in which, in addition to the exhaust gases of the revolving tubular kiln 6, cooler air is also introduced into the precalcination zone (gas line 7') through the pipe 25. This pipe 25 branches into two pipe sections 25a, 25b which open into the gas line 7' at opposite points for example. The material from the second cyclone stage 2 is introduced into these pipe sections 25a, 25b through material lines 26a, 26b. As in the first embodiment, the fuel is introduced into the precalcination zone (gas line 7') through the pipes 10, 11. The third and fourth cyclone stages 3 and 4 which are not shown in FIG. 2 correspond to the embodiment illustrated in FIG. 1.

The arrangement of the temperature sensors 14, 15, 16, 17, the measuring, indicating and regulating system 20, the regulating unit 21, the sensors 23 and the measuring device 24 also corresponds to the embodiment illustrated in FIG. 1.

We claim:

1. In a process for the heat-treatment of fine-grained material which is preheated by hot gases in a multistage preheater, subsequently deacidified to a large extent by the combustion of additional fuel in a precalcination zone, and calcined in a revolving tubular kiln, and wherein the supply of fuel to the precalcination zone automatically is regulated in normal operation in dependence upon the gas temperature of the preheater in such a way that, in the event of a reduction in said gas temperature, the supply of fuel is increased and vice versa, the improvement comprising measuring the temperature of the material as it leaves the precalcination zone, simultaneously measuring the temperature of the gases leaving the precalcination zone, measuring the difference between the material temperature and the gas temperature, and switching the regulation of the supply of fuel to said precalcination zone from automatic to manual in response to a predetermined maximum or minimum value of said temperature difference.

2. A process according to claim 1 wherein the temperature of said material and the gas temperature are measured adjacent the final stage of said preheater.

3. A process according to claim 1 wherein the preheater has a final stage formed by at least two cyclones connected in parallel, and wherein in normal operation the supply of fuel to the precalcination zone is regulated in dependence upon the mean value of the exhaust gas temperatures of the two cyclones of the final stage, the difference between each of the two exhaust gas temperatures and the temperature of the material deposited from the final stage is monitored and the regulation of the fuel supply to the precalcination zone is switched to manual when one of the two temperature differences reaches said a maximum or minimum value.

4. A process according to claim 1 wherein the allowable value of the difference between the gas and material temperatures is on the order of 20° C., and wherein the regulation of the supply of fuel is switched to manual when the temperature difference reaches a minimum value of about 0° C. and a maximum value of about 40° C.

5. A process according to claim 1 wherein the regulation of the fuel supply to the precalcination zone is switched to manual in response to a maximum exhaust gas temperature of the preheater final stage of about 900° C. or a minimum exhaust gas temperature of about 800° C.

6. A process according to claim 1 including monitoring the gas stream flowing through the preheater for its CO and $O_2$ content.

7. A process according to claim 6 including terminating the supply of fuel to the precalcination zone in response to a predetermined content of CO in said gas stream.

8. A process according to claim 6 including setting off an alarm in response to a minimum content of $O_2$ in said gas stream.

* * * * *